4 Sheets—Sheet 1.

T. B. DE FOREST.
EYELETING MACHINE.

No. 37,418. Patented Jan. 13, 1863.

Witnesses.
Thos Shelton Lindseye
Jos P. Canfield

Inventor.
Thomas B. De Forest.

T. B. DE FOREST.
EYELETING MACHINE.

No. 37,418. Patented Jan. 13, 1863.

Witnesses.
Thos Shelton Lindsey
Jos P Canfield

Inventor.
Thomas B. De Forest.

THE NORRIS PETERS CO., PHOTO-LITHO., WASHINGTON, D. C.

4 Sheets—Sheet 3.

T. B. DE FOREST.
EYELETING MACHINE.

No. 37,418. Patented Jan. 13, 1863.

Witnesses.
Thos. Shelton Rudley
Jos. P. Canfield

Inventor.
Thomas B. De Forest

4 Sheets—Sheet 4.
T. B. DE FOREST.
EYELETING MACHINE.
No. 37,418. Patented Jan. 13, 1863.
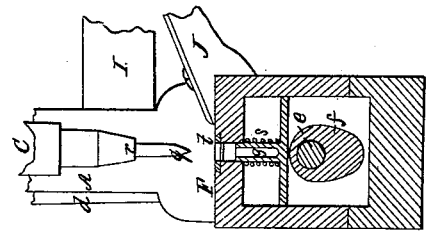
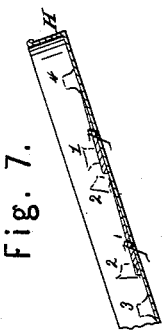
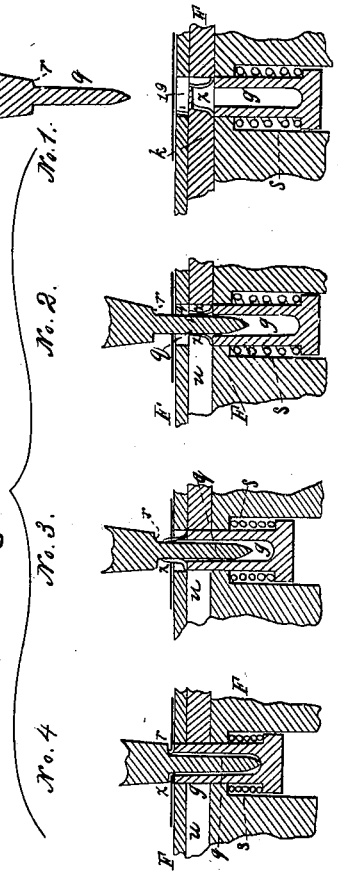
Witnesses.
Thos Shelton Birdseye
Jos P Canfield
Inventor.
Thomas B. De Forest.

UNITED STATES PATENT OFFICE.

THOMAS B. DE FOREST, OF BIRMINGHAM, CONNECTICUT, ASSIGNOR TO HIMSELF AND LINSON DE FOREST, OF SAME PLACE.

IMPROVEMENT IN EYELETING-MACHINES.

Specification forming part of Letters Patent No. 37,418, dated January 13, 1863.

*To all whom it may concern:*

Be it known that I, THOMAS B. DE FOREST, of Birmingham, of the county of New Haven, in the State of Connecticut, have invented certain new and useful Improvements in Eyeleting-Machines; and I do hereby declare that the following is a full and exact description thereof, reference being had to the accompanying drawings, making part of this application.

My invention relates to certain improvements in eyeleting-machines, and has for its object a new method of feeding or supplying the eyelets to the eyeleting-dies; and to this end my invention consists in the employment of a hopper and shaking table in connection with a device for effecting the turning of the eyelets into the proper position to be received into a conductor, as hereinafter more fully described.

My invention further consists in the employment, in connection with the said conductor, of a device or mechanism for discharging from the conductor all eyelets received by it in a position in which they cannot pass to the feeder.

My invention further consists in the use of a feeder so constructed as to force the eyelets one at a time over the lower die, and at the same time prevent the eyelet from being thrown off from the top of said die and from being forced onto the die in an improper position, as will be hereinafter more fully explained.

To enable those skilled in the art to make and use my invention, I will proceed to describe my several improvements as I have successfully practiced them.

Figure 1:
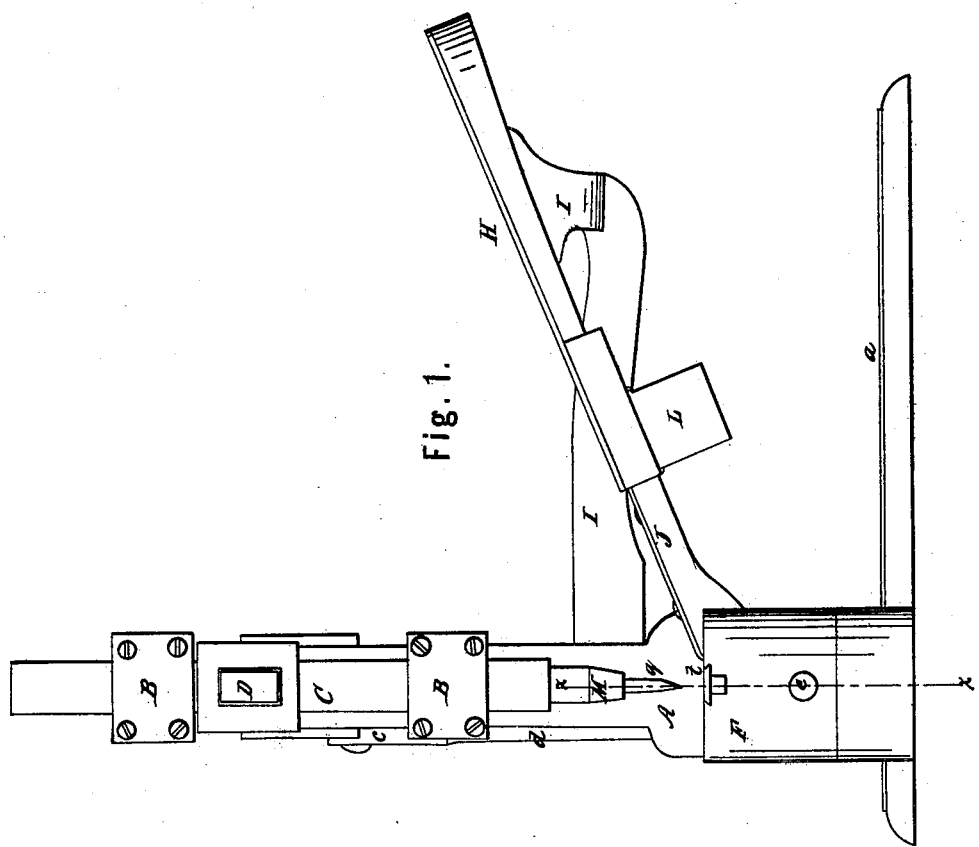
Figure 2:
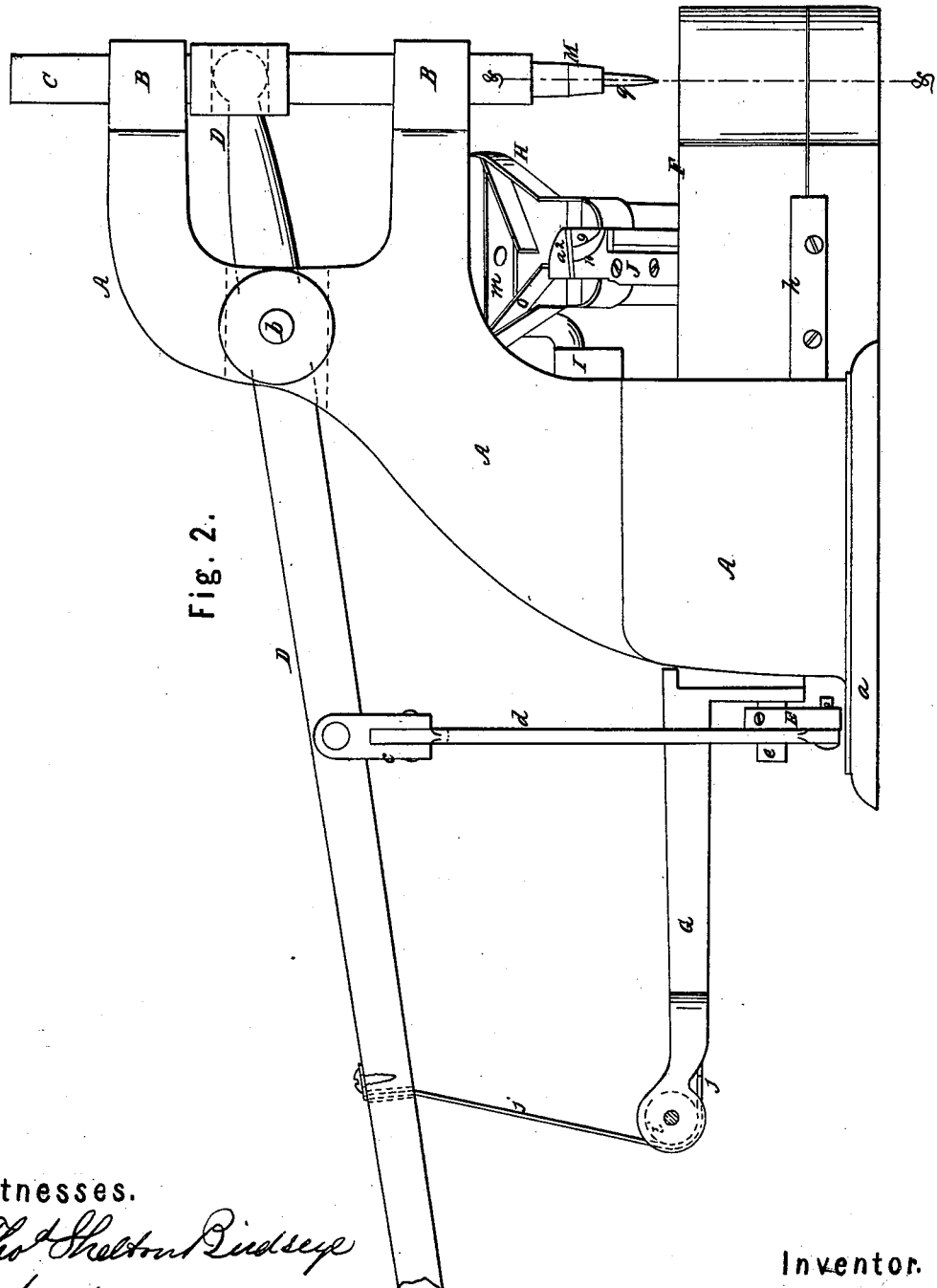
Figure 3:
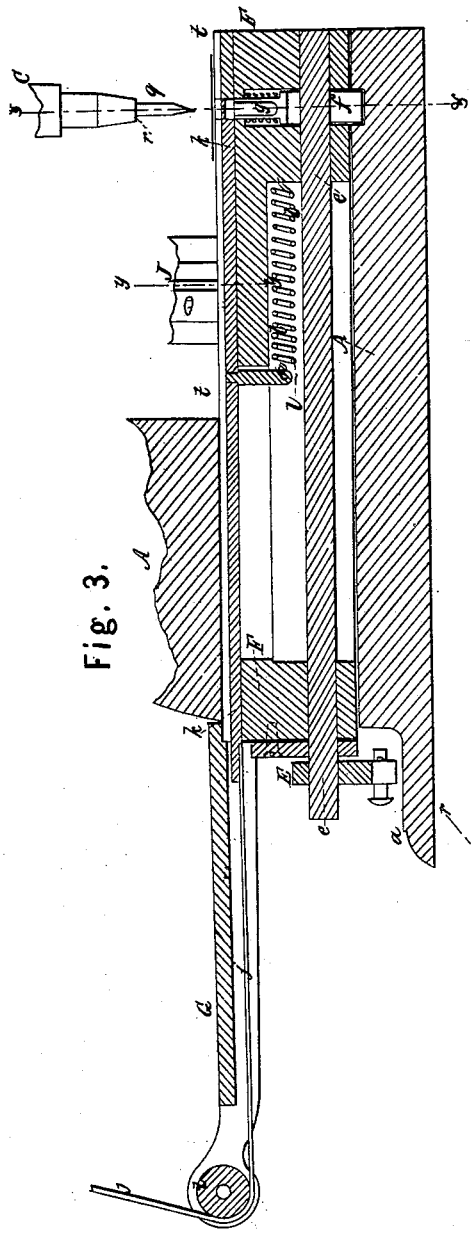
Figure 4:
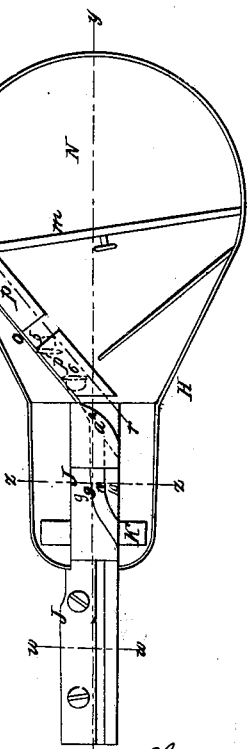
Figure 5:
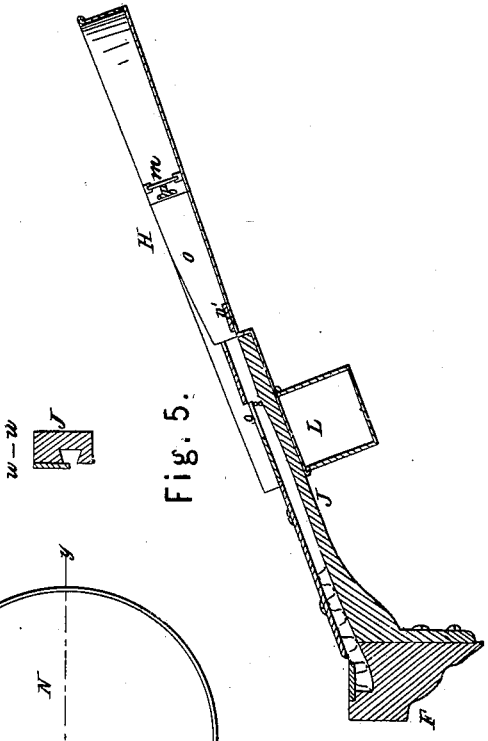

In the accompanying drawings, forming part of this application, Figure 1 is a front elevation of an eyeleting-machine embracing my several improvements. Fig. 2 is a side elevation of the same. Fig. 3 is a partial vertical section of the same at the line $x\,x$ of Fig. 1. Fig. 4 is a detail top view of the hopper and feed-table. Fig. 5 is a vertical section of the same at $y\,y$, Fig. 4. Fig. 6 is a view showing the conductor and discharging device in section at the lines $w\,w$ and $z\,z$, Fig. 4. Fig. 7 is a vertical section at the line $r\,r$, Fig. 4. Fig. 8 is a vertical section at the line $\&\,\&$, Fig. 2; and Fig. 9 embraces four vertical sections illustrating the operation of inserting and securing the eyelet in the work or material.

Although my invention relates particularly to improvements in the feeding mechanism proper, I have shown in the drawings all the other parts of a complete eyeleting-machine, and shall describe briefly the construction and operation of the whole apparatus in order that my several improvements and their applications may be more perfectly comprehended.

In the several figures the same part will be found always indicated by the same letter of reference.

A is the main frame of the machine, which extends up from a suitable base, $a$, by which the machine is fastened to a table or supporting stand, as the case may require.

F is the bed-plate of the machine, which is secured on the top of the plate $a$, and in which are arranged and work the lower set or die and the feeder and their operating devices. The main frame A is formed with two arms or stands, B B, provided with suitable bearings, and in which works the vertically-reciprocating bar C. This bar carries at its lower end the upper set or die and a punch, and is worked by means of the lever D, which is pivoted at $b$ in the frame A, is connected at its forward end to the bar C, and at its rear end to a treadle or other mechanism, through which power is applied to the machine. To the lever D is hung a link, $c$, in which is pivoted one end of a connecting-rod, $d$, the other end of which is pivoted to the crank E. This crank is fast on the rear end of a shaft, $e$, which is thus partially rotated in opposite directions alternately (by means of the pitman $c$, connected to lever D.) At each vibration of the lever D this shaft $e$ passes through the bed-plate F, (see Fig. 3,) and has near its forward end a cam, $f$, which operates to lift the die $g$, which is depressed and kept down on the face of cam $f$ by means of a spring, $s$. (See Fig. 9.)

G is an arm extending back from the rear of the frame A, attached to the bed-plate F, and for the purpose of supporting a pulley, $i$, over which passes a cord or band, $j$, connected at one end to the lever D, and at the other to the rear end of a feeder-bar, $k$. This bar $k$ works in a suitable slot or channel formed in the bed-plate F, and is for the purpose of feeding the eyelets to the lower die, g. The bar k is drawn back through the medium of strap i by the motion of lever D, and is forced forward by the action of the spiral spring l. (See Fig. 3.) This feeder-bar k is formed with a lip, 19, in its forward end, for purposes which will be presently explained.

I is a stand or arm extending out from one side of the frame A, and supporting the hopper and shaking table.

H is the hopper and table; J, the conductor, and L the surplus box.

The eyelets for supplying the machine are thrown into the hopper N, (see Fig. 4,) in which they are retained by a partition, m, (in which is a slide or gate,) except at one end, by which the eyelets are allowed to pass at the point n. (See Fig. 4.) The hopper and feed table are constantly jarred by the working of the machine, (or otherwise, if preferred,) which causes the eyelets to flow gradually down through the opening at n and onto the surface of the turning-block p. From thence they pass onto and over another turning block, p', and from thence into the conductor J, which conducts them to the feeder, by which they are fed to the eyeleting-dies. The feeder k carries the eyelets one at a time to the lower die, g. The material to be eyeleted is placed on the top of the bed-plate F, and there perforated by the punch q, and the eyelet inserted and clinched by the joint action of the two dies q and r, all as illustrated at Fig. 9.

The construction and operation of the machine, with the exception of the hopper and feeder-bar, are substantially the same as that of an improved eyeleting-machine of Linson De Forest, in whose application such a machine is fully described; and I need only, therefore, describe particularly my improved feeding devices.

The peculiar shape of the blocks p and p' is clearly shown in the drawings. As the eyelets come onto the first block p, all of them which are rolling on their sides will, if not getting onto either of their bases, roll on down over both blocks p and p', and, striking against the deflector $a^2$, will be deflected off toward the opening k, (see Fig. 4,) through which they will fall into box L. This box is removable, and when full is withdrawn and its contents emptied into hopper N, and there replaced. All eyelets which come into p in the position shown in red at 4, Fig. 7, will pass on in this position over blocks p and p' and down through the conductor J to its lower end, as shown at Fig. 5. Those eyelets which come onto the block p in the position seen at 1, Fig. 7, will, in passing off of block p, be turned onto the position shown at 2. In this position it will slide along until it passes off of the block p', when it will be turned into the position shown at 3, in which position it will enter and pass down through the conductor J. Although only the eyelets in the position seen at Fig. 3 should pass to the eyeleting mechanism, the conductor J will receive eyelets in a position opposite to that seen at 3— that is, with their flanged bases upward instead of down; but I have provided the conductor J with a device for discharging from it all eyelets which may enter in a position opposite to that shown at 3. This device consists of the lips 9 and 10 and a peculiar shape of the surface at the point 8 (see Fig. 5) of the conductor. When an eyelet enters the conductor with its flange uppermost, when it arrives at the portion 8, its flange will project above and over the lips 9 and 10, and, as it continues to pass along, the flange will come down onto the lips 9 10, on which the eyelet will continue to ride, in consequence of the depression of the bearing-surface of the conductor J, and the lips 9 and 10 will conduct the eyelet off to the waste-box L. The positions of the eyelet on lips 9 and 10 is seen in red at section z z, Fig. 6, and of those which pass under the lips at W W, section Fig. 6. It will be understood that the conductor J affords a supply-column of eyelets (in a given proper position) to the feeder. The feeder takes a single eyelet each time of its reciprocation forward to the eyeleting mechanism, substantially as shown and described, of L. De Forest's machine, before referred to.

It has sometimes occurred that an eyelet fed rapidly onto the die g would get upset or misplaced on said die. To prevent this occurrence, I make the feeder k in my machine with a projecting lip, 19, (see Figs. 9 and 3,) which retains the eyelet in its proper position on die g long enough to insure its remaining so.

Having described the nature of my invention and the operation of my improvements, what I claim as new, and desire to secure by Letters Patent, is—

1. The employment, in combination with a hopper and shaking table, substantially as described, of a mechanism for turning those eyelets which start in a moving position over into the proper position, substantially as set forth.

2. In combination with a conductor, J, or its equivalent, a device for discharging from it all eyelets which may have entered it in a wrong position, substantially as hereinbefore described.

3. Forming a lip, 19, or its equivalent, on the forward end of the feeder, to prevent the displacement of the eyelets, substantially as hereinbefore set forth.

In testimony whereof I have hereunto set my hand and affixed my seal this 13th day of December, 1862.

THOMAS B. DE FOREST. [L. S.]

Witnesses:
 GEO. W. HUBBELL,
 BENJAMIN H. HOADLEY.